United States Patent
Kekre et al.

(10) Patent No.: US 7,409,495 B1
(45) Date of Patent: Aug. 5, 2008

(54) METHOD AND APPARATUS FOR PROVIDING A TEMPORAL STORAGE APPLIANCE WITH BLOCK VIRTUALIZATION IN STORAGE NETWORKS

(75) Inventors: Anand A. Kekre, Pune (IN); Ankur P. Panchbudhe, Nagpur (IN); Vrijendra S. Gokhale, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 777 days.

(21) Appl. No.: 11/020,863

(22) Filed: Dec. 22, 2004

(51) Int. Cl.
*G06F 12/16* (2006.01)
(52) U.S. Cl. .......................... 711/114; 711/6; 711/162; 711/170; 707/204; 709/217; 709/218; 709/219
(58) Field of Classification Search .............. None
See application file for complete search history.

(56) References Cited

U.S. PATENT DOCUMENTS

| | | | |
|---|---|---|---|
| 6,883,083 B1 * | 4/2005 | Kemkar | 711/203 |
| 6,948,044 B1 * | 9/2005 | Chandrasekaran | 711/203 |
| 6,985,490 B2 * | 1/2006 | Czeiger et al. | 370/401 |
| 7,093,090 B1 * | 8/2006 | Kekre et al. | 711/162 |
| 7,124,246 B2 * | 10/2006 | Nagasuka et al. | 711/114 |
| 7,236,987 B1 * | 6/2007 | Faulkner et al. | 707/104.1 |
| 7,313,614 B2 * | 12/2007 | Considine et al. | 709/223 |
| 7,334,106 B2 * | 2/2008 | Serizawa et al. | 711/202 |
| 2004/0148460 A1 * | 7/2004 | Steinmetz et al. | 711/114 |
| 2004/0148477 A1 * | 7/2004 | Cochran | 711/162 |
| 2005/0044199 A1 * | 2/2005 | Shiga et al. | 709/223 |
| 2005/0108486 A1 * | 5/2005 | Sandorfi | 711/162 |
| 2005/0228950 A1 * | 10/2005 | Karr | 711/114 |
| 2006/0206603 A1 * | 9/2006 | Rajan et al. | 709/223 |
| 2008/0016275 A1 * | 1/2008 | Sebastian et al. | 711/114 |

* cited by examiner

*Primary Examiner*—Jack A Lane
(74) *Attorney, Agent, or Firm*—Campbell Stephenson LLP; Jonathan N. Geld (57) ABSTRACT

Methods, systems, and computer program products to provide temporal storage in a fabric-based virtualization environment are presented. Such capacity is provided through the association of a temporal storage appliance, which is configured as a member of a linked VLUN with a non-temporal disk volume. The linked VLUN is provided by a virtualizing fabric switch to a network node such as a network node.

7 Claims, 7 Drawing Sheets

METHOD AND APPARATUS FOR PROVIDING A TEMPORAL STORAGE APPLIANCE WITH BLOCK VIRTUALIZATION IN STORAGE NETWORKS

FIELD OF THE INVENTION

The field of this invention relates to data storage systems. Specifically, a method and apparatus is presented to provide temporal storage capability for virtualized disk volumes provided by a virtualizing fabric switch.

BACKGROUND OF THE INVENTION

The ready ability for a business to store, process and to transmit data is a facet of operations that a business relies upon to conduct its day-to-day activities. For businesses that increasingly depend upon data for their operations, an inability to store, process, or transmit data can hurt a business' reputation and bottom line. Businesses are therefore taking measures to improve their ability to store, process, transmit, and restore data, and to more efficiently share the resources that enable these operations.

The ever-increasing reliance on data and the computing systems that produce, process, distribute, and maintain data in its myriad forms continues to put great demands on techniques for data protection. Simple systems providing periodic backups of data have given way to more complex and sophisticated data protection schemes that take into consideration a variety of factors, including a wide variety of computing devices and platforms, numerous different types of data that must be protected, speed with which data protection operations must be executed, and flexibility demanded by today's users.

In many cases, disaster recovery involves restoring data to a point in time when the desired data was in a known and valid state. Backup schemes to ensure recoverability of data at times in the past are varied. Such schemes have traditionally included periodic full backups followed by a series of differential backups performed at intervals between the full backups. In such a manner, a data set can be restored at least to a point in time of a differential backup. Such an approach can be resource intensive as permanent records of the full and differential backups must be kept in order to ensure that one can restore a data set to a state at a particular point in time, especially to point in the distant past. Further, the process of restoring a data volume from a full and a series of differential backups can be time and resource consuming, leading to delays in making the data available to the users.

One approach to providing a less resource-intensive capacity to restore a data set to a particular prior point in time is temporal storage, also known as time-indexed storage and time-addressable storage. Temporal storage can be implemented by associating a temporal volume with a particular data set. A temporal volume maintains non-present data in addition to the data in its present state. A temporal volume maintains the history of data stored on it, thus providing a way for an application to retrieve a copy of the data at any time in the past.

Temporal volumes provide an infrastructure for maintaining and accessing temporal data. Temporal volumes can be used by applications at all levels, including file systems and database management systems. In addition, temporal volumes can also be used as building blocks for data archival, versioning, replication, and backup through integration with file system and backup products. Temporal volumes preserve temporal content so that the content can be used at a later point in time for snapshots, incremental backups, replication, restoring corrupted volumes or deleted files, etc.

In a normal volume, when data changes, the corresponding data blocks are changed in situ. In a temporal volume, when a block of data is changed, the existing block can be preserved along with some record of the time of change, and then the new data is written. Old versions of a data block are maintained even when the data block is deleted. This achieves the effect of maintaining copies of one or more states of the data in the past. This process can also be thought of as continuous versioning of the data on the disk volume, and retaining snapshots of the volume whenever it changes. Another temporal storage implementation provides the same effect of maintaining data at points in time by writing new data blocks to a separate location, associating the time with the new data blocks, and manipulating associated metadata in the temporal volume to refer to the new data blocks.

There are many possible embodiments for temporal volumes. In one embodiment, the contents of a temporal volume can be preserved using an indexing system or structure. An indexing structure can be formed using a space-optimized persistent store by allocating the storage over a cache object. A cache object is a logical storage object that gives an illusion of infinite space, while using only limited actual storage space. The cache object accomplishes this by provisioning storage on an as-needed basis. In an alternate embodiment, a temporal volume can be log-structured. In a log-structured temporal volume, data modifications are preserved in an append-only log as the data is written to data volumes. A time-index is maintained on the data log, thus permitting access to data at all points of time recorded.

In another embodiment, the temporal volume can be divided into one or more regions. A region may be anywhere from one physical block of the disk to regions of kilobytes, megabytes, gigabytes, etc. Each region can have a time stamp associated with it. Applications accessing the temporal volume can specify the time stamps associated with the regions. Alternatively, a time stamp may be specified by an application or the temporal volume manager when data is written to the temporal volume.

Time history of data in a temporal volume can be supplied and maintained in several ways, including, but not limited to: continuous checkpointing, I/O controlled checkpointing, application controlled checkpointing, and periodic checkpointing.

In continuous checkpointing, every write operation to data on the temporal volume is checkpointed and includes a time stamp generated by the temporal volume. In this manner, each change to data is maintained for subsequent access.

In I/O controlled checkpointing, an application using the temporal volume can provide checkpoints or time stamps when writing to the temporal volume. Such a time stamp can be provided to the temporal volume manager with every I/O request or alternatively only with I/O requests that modify the temporal data.

In application-controlled checkpointing, an application can issue an I/O request that specifies a time stamp for a region or the entire volume when required or desired. In application-controlled checkpointing, an I/O request can be issued that specifies a new checkpoint or timestamp within the temporal volume, rather than providing a time stamp with every write. An application can tell the temporal volume when to create a checkpoint version.

Periodic checkpointing involves performing automatic checkpointing periodically (e.g., every 10 seconds or every 10 minutes). In periodic checkpointing, a temporal volume manager provides an interface that enables periodic, temporal checkpointing at the logical device (volume) level. The temporal volume manager will periodically checkpoint or timestamp all changes to data on the volume during the set period. Should a block be modified multiple times during a particular period, only the last modification will be temporally captured via a timestamp. This saves storage space by not storing each change to data.

Temporal storage provides an ability for a user or application to access data as it was at a chosen point in time. Time becomes a dimension in storage. Such a capacity can be useful, e.g., in data mining for finding patterns and behaviors in customer data; data warehouses in which the time dimension can be stored and utilized in querying data stored in the warehouse; data archival and auditing wherein the time-indexed archives can be later used for analysis; and, data restoration to a particular time.

Temporal volumes can be provided by a temporal storage appliance. Such temporal storage appliances are typically made part of a disk volume set by host-based disk virtualization. A temporal storage appliance may include, in addition to a temporally structured volume, non-temporally structured disk volumes as an aid in mirroring and data recovery.

In addition to providing an ability to recover data, businesses are also faced with the task of managing, supporting, and providing large amounts of disk space to many distributed computers. Rather than physically distribute disks attached to the computing resources, which can create logistical difficulties in maintaining and supporting the disk volumes, businesses physically disassociate disk volumes from the compute resources. Such a disassociation may take place in a storage area network (SAN) on which the disk volumes reside and through which disk volume capacity is provided to compute resources. An application server can serve as a volume manager for one or more of these SAN resident disks to create disk aggregates called logical unit numbers (LUN).

An alternative to having a volume manager resident on an application server is to offload that task to a fabric resident switch within a storage area network. Such a virtualizing fabric switch can handle the aggregation of physical or virtual storage into logical units and can also handle tasks related to mirroring of data and linking (described below) LUNs together.

A virtualizing fabric switch will pass a write stream sent from a network node to all disks that are part of a virtual LUN (VLUN). However, a virtualizing fabric switch cannot provide temporal storage capability since creation and maintenance of temporal indexes in the I/O path is undesirable. Virtualizing fabric switches do not have a cache or the capacity to perform temporal indexing outside the I/O path.

It is therefore desired to provide the benefits of temporal storage in a storage environment that provides fabric-based virtualization.

SUMMARY OF THE INVENTION

The present invention provides a method, system, and apparatus for temporal storage, and the benefits therefrom, in a fabric-based virtualization environment. Such capacity is provided through the association of a temporal storage appliance, which is configured as a member of a linked VLUN provided by a fabric switch. In such an environment, two VLUNs are linked, one representing the temporal storage appliance, and the other being a disk volume set (real or virtual) for which a temporal history of changes is desired. Alternatively, the temporal storage appliance can be associated with the disk volume set through the virtualizing fabric switch as a mirror volume to the disk volume set.

In one embodiment of the present invention, a system incorporating a disk volume, a temporal storage appliance, and a virtualizing fabric switch is described. The virtualizing fabric switch is coupled to the disk volume and the virtualizing fabric switch and links the disk volume and the temporal storage appliance as a linked volume set. The virtualizing fabric switch serves the linked volume set to a network node as a virtual logic unit number (VLUN).

In one aspect of this embodiment, each member of the linked volume set receives a copy of each block of data written to the volume set. In another aspect of this embodiment, the temporal storage appliance comprises a data storage device that comprises data associated with a time in which the data was written. In a further aspect of this embodiment, the system further comprises a storage area network, wherein the disk volume, temporal storage appliance, and the virtualizing fabric switch are nodes on the storage area network.

In another embodiment of the present invention, a method, apparatus, and a computer program product link a temporal storage appliance and a disk volume as a linked volume set and the linked volume set is presented to a network node as a VLUN. The temporal storage appliance associates a timestamp with data written to the temporal storage appliance. In one aspect of this embodiment, linking comprises providing data blocks written to the VLUN to the temporal storage appliance and providing a copy of the data blocks written to the VLUN to the disk volume.

In another embodiment of the present invention, a method and computer program product provide a virtualizing fabric switch receiving a request for data stored on a VLUN in which the request is for data at a defined time, wherein the VLUN comprises a disk volume and a temporal storage appliance, and the virtualizing fabric switch requests the data from the temporal storage appliance. The temporal storage appliance is coupled to a storage area network. In one aspect of this embodiment, the virtualizing fabric switch provides the requested data to a network node coupled to the storage area network.

In another embodiment of the present invention, a method and computer program product present a virtualizing fabric switch providing a VLUN comprising a disk volume and temporal storage appliance, wherein the virtualizing fabric switch receives a request to restore data on the VLUN to a state in time prior to the request, and the virtualizing fabric switch requests the temporal storage appliance to create a point-in-time volume representing the state of data on the VLUN at the requested point in time. In one aspect of this embodiment, the virtualizing fabric switch transfers data from the point-in-time volume to the disk volume.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention, in one embodiment, combines the scalability and flexibility of network-based virtualization (e.g., a SAN switch) with a powerful method of data reclamation to a point in time through a temporal storage appliance. Temporal referencing through the addition of a temporal volume provides a capability not heretofore available through network-based virtualization.

Figure 1A:
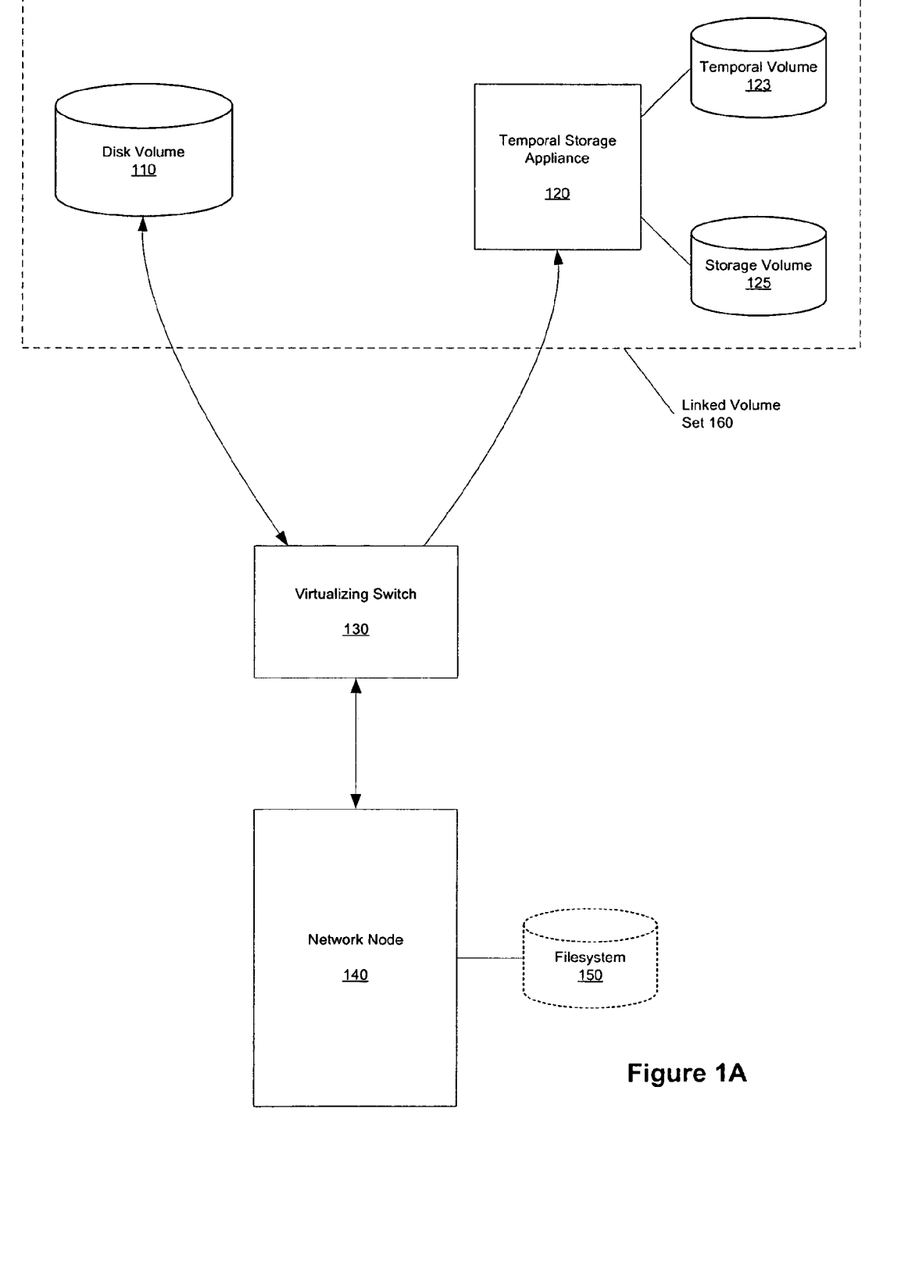
FIG. 1A illustrates a simplified network diagram incorporating one embodiment of the present invention.

FIG. 1A illustrates a simplified network diagram incorporating one embodiment of the present invention. A network-resident disk volume 110 is coupled to a switch 130. Switch 130 is also coupled to a temporal storage appliance 120. Temporal storage appliance 120 is shown coupled to a temporal volume 123 and a storage volume 125. Temporal storage appliance 120 can include temporal volume management software to manage the temporal volume and control the temporal volume's interaction with other parts of the temporal storage appliance, other storage volumes, and switch 130.

Switch 130 is configured to be a virtualizing switch, thus providing volume management tools. The volume management tools present disk volume 110 as a virtualized logic unit number (or VLUN) to network node 140 for storing and accessing data. Virtualizing switch 130 can also present temporal storage appliance 120 as a VLUN. Virtualizing switch 130 can also link the VLUN associated with disk volume 110 with the VLUN associated with temporal storage appliance 120 as a linked volume set 160 presented to network node 140 as a single VLUN. Virtualizing switch 130 can alternatively associate disk volume 110 and temporal storage appliance 120 as a mirrored volume set, and present the mirrored volume set to network node 140 as a single VLUN. Network node 140 can be an application server or any other computing node that can provide write operations to the VLUN. The single VLUN can be mounted by the network node as a file system 150 (illustrated with a broken line to emphasize its virtual nature) or as a non-file structured storage volume for use by applications such as databases.

Network node 140 can conduct a write operation to the mounted VLUN (either as file system or non-file structured storage), which results in a transfer of one or more blocks containing modified or new data to switch 130. The switch then transmits copies of those blocks to members of linked volume set 160. Thus, disk volume 110 and temporal storage appliance 120 receive respective copies of the blocks transmitted to switch 130. Disk volume 110 stores the blocks it receives in a standard fashion, while the temporal storage appliance 120 can store the blocks it receives from switch 130 in accord with a manner discussed above dependent upon the implementation of the temporal storage appliance.

Figure 1B:
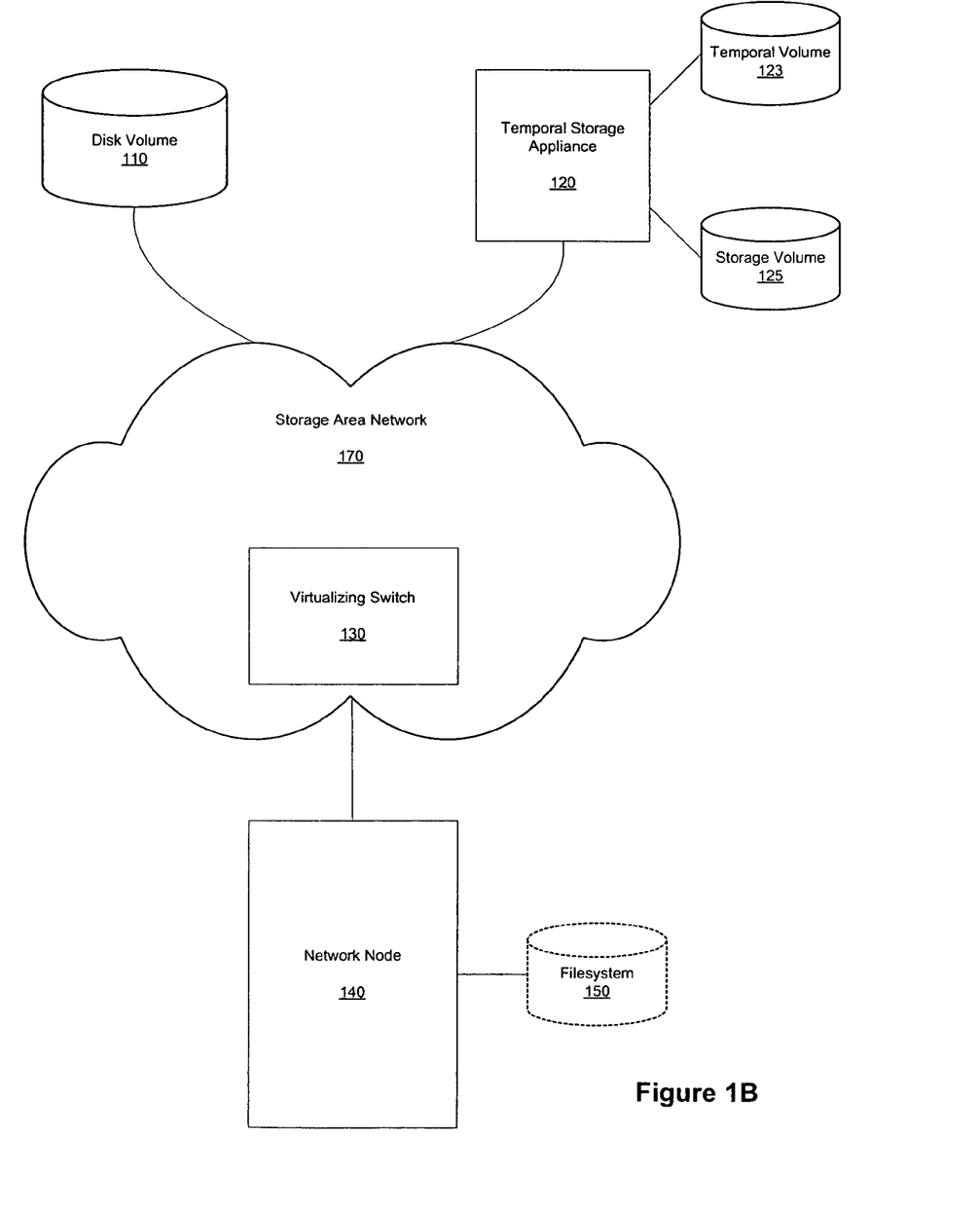
FIG. 1B illustrates a simplified network diagram incorporating another embodiment of the present invention.

An alternate network structure embodying the current invention is illustrated in FIG. 1B. FIG. 1B places virtualizing switch 130 within a storage area network 170. Virtualizing switch 130 is within the SAN fabric and can function as an interface between network node 140 and the storage area network. In such an arrangement, the disk volume associated with 110 can be a number of disk units, real or virtual, coupled to virtualizing switch 130 through the SAN. Temporal storage appliance 120 is also a node on the storage area network accessible by the virtualizing switch. As in FIG. 1A, virtualizing switch 130 can present to network node 140 disk volume 110 and temporal storage appliance 120 as a single VLUN that links the disk volume with the temporal storage appliance, which is accessed by network node 140 through mounted file system 150.

In order to provide file system data modified by a write, to both disk volume 110 and temporal storage appliance 120, virtualizing switch 130 links the disk volume and the temporal storage appliance (or their associated LUNs) so that the temporal storage appliance receives a copy of write modified data that is provided to the disk volume, as if the temporal storage appliance was a mirror of the disk volume. Upon creating a link between disk volume 110 and temporal storage appliance 120, the temporal storage appliance can be brought up to date by duplicating the present content of the disk volume to the temporal storage appliance. Such a transfer of data will set an initial time behind which one could not use the temporal storage appliance to ascertain a data condition prior. Subsequent to the initialization of the link, any write sent to disk volume 110 will also be sent to temporal storage appliance 120 where it will be recorded in a manner consistent with the implementation of the temporal storage appliance. In general, while write operations impact both disk volume 110 and temporal storage appliance 120, normal read operations will only be addressed from disk volume 110 and not the temporal storage appliance. This "normal" state of operations is emphasized in FIGS. 1A by the use of double-ended arrow connectors represent read/write connections and single-ended connectors representing a write-only connection.

Figure 2:
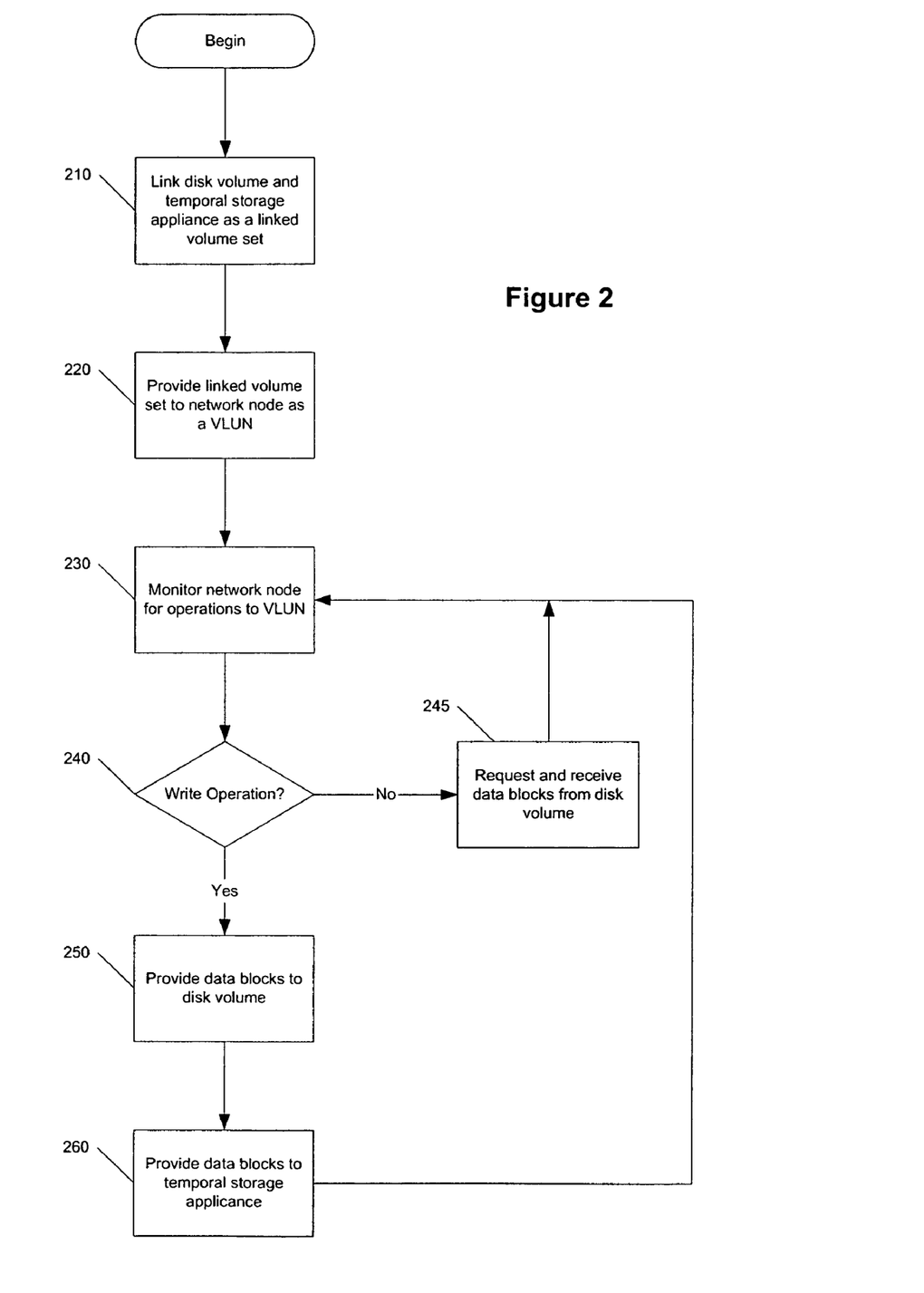
FIG. 2 is a simplified flow diagram illustrating a procedure for applying write operations to both a disk volume and a temporal storage appliance in accord with one embodiment of the present invention.

FIG. 2 is a simplified flow diagram illustrating a procedure for conducting operations involving a disk volume linked with a temporal storage appliance. Initially, a disk volume and temporal storage appliance are linked as a linked volume set (210). This linkage is performed by a virtualizing fabric switch. The virtualizing fabric switch provides the linked volume set to a network node as a VLUN (220). The virtualizing switch then monitors the network node for operations addressing the VLUN (230). When an operation targeted at the VLUN is detected, it is determined whether the operation is a write operation (240); if not, then the requested blocks of data are read from the disk volume (245) and the switch returns to monitoring for additional operations. If a write operation is detected, then the switch provides the write-modified data blocks to the disk volume (250) and provides a copy of those data blocks to the temporal storage appliance (260). The temporal storage appliance stores the data in a manner consistent with the implementation chosen for the temporal storage appliance, as discussed above.

A more detailed explanation of the process of linking volumes through a virtualizing fabric switch can be found in co-pending application Ser. No. 11/028,441, entitled "Efficient Synchronous Data Replication for Distant Fiber Attached Storage, Via the Instantiation of Local and Remote Volumes on Multiple Virtualization Switches Available at the Local and Remote Sites," submitted by Subhojit Roy, Prasad Limaye, Niranjan Pendharkar, and Ronald Karr, which is incorporated herein by reference for all that it teaches.

Figure 3:
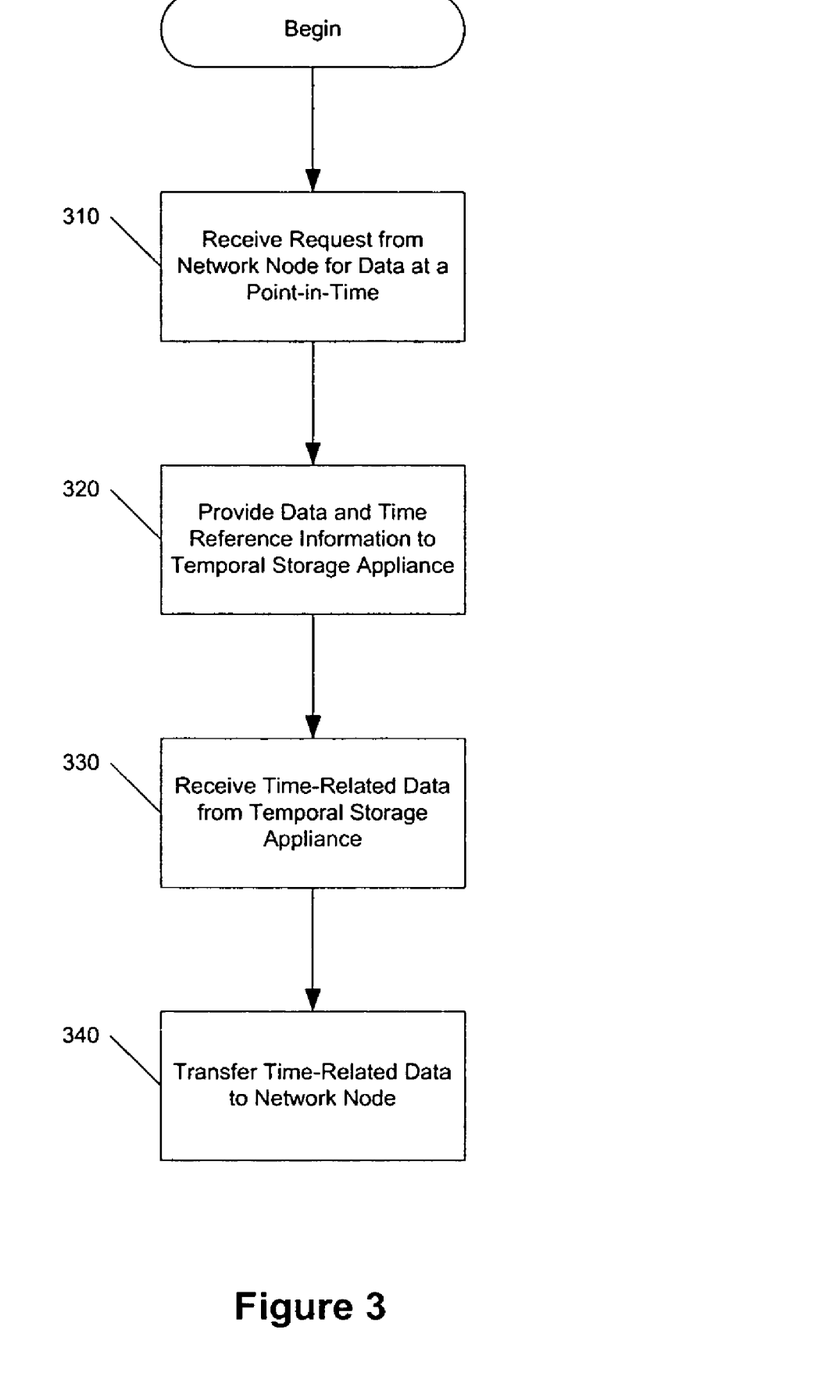
FIG. 3 is a simplified flow diagram illustrating a process performed in response to a request from a network node for time-related data in accord with one embodiment of the present invention.

FIG. 3 is a simplified flow diagram illustrating a process performed in response to a request from a user or application for time-related data. Such a process can be performed by a virtualizing fabric switch that links a disk volume and temporal storage appliance as a VLUN presented to a network node. Initially, the virtualizing fabric switch can receive a request from the network node for data at a point-in-time (310). As discussed above, such a request may be prompted by, for example, a data-mining exercise in which a user or application seeks to determine how particular information has changed over time. Information specifying the point-in-time of the desired data will be provided by the network node through the virtualizing fabric switch in a form appropriate to the temporal volume manager. In response to such a request, the virtualizing fabric switch forwards the requested time information to the temporal storage appliance (320). There should be no need to quiesce the linked volume set from providing other operations. Once the requested data is found by the temporal storage appliance, the data is provided to the network node through virtualizing switch. In this scenario, the virtualizing fabric switch provides the network node a read path to the temporal storage appliance. The virtualizing fabric switch can receive the data from the temporal storage appliance (330) and then transfer the time-related data to the network node for analysis (340).

Figure 4:
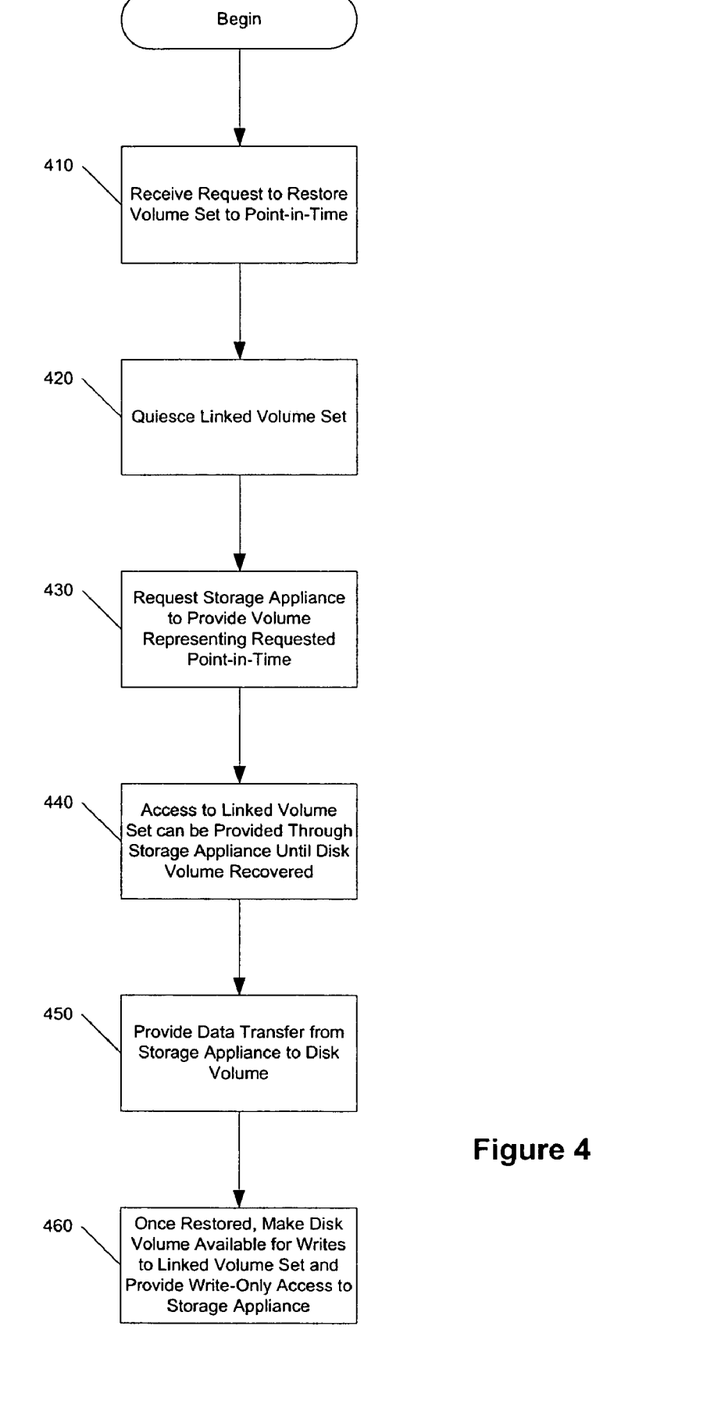
FIG. 4 is a simplified flow diagram illustrating a process to restore a linked volume set to a chosen particular point in time in accord with one embodiment of the present invention.

FIG. 4 is a simplified flow diagram illustrating a process to restore a linked volume set to a chosen particular point in time. Initially, a virtualizing fabric switch receives a request to restore the volume set to a point in time (410). Such a request can be made as a result of data corruption occurring after that point in time or for any other reason that data at that particular point in time is desirable. In response to the request, the virtualizing switch can quiesce the linked volume set (420), thus temporarily preventing reads and writes from occurring to the linked volumes. The virtualizing fabric switch can then forward the time-related information to the temporal storage appliance, which then builds a volume within the storage appliance representing the data at the point in time (430) or otherwise prepares an image of data at the requested point in time. Such a point-in-time volume can be built on, for example, storage volume 125 as illustrated in FIGS. 1A and 1B, or in disk volumes connected to the storage appliance designated for data recovery. Alternatively, a point-in-time volume need not be physically built, but instead virtually reconstructed by referring to both a good initial state of data stored at a time prior to the requested point in time, and to temporal data to arrive at a full set of data at the requested point in time. Once the storage appliance has built or reconstructed a point-in-time volume, the virtualizing switch can once again allow normal operation access to the VLUN by directing read/write operations to the point-in-time volume (440). Such read/write access to the point-in-time volume continues until the linked disk volume is restored to the desired point in time. In this manner, a restore to the point in time is effectively instantaneous from the perspective of a user or an application using the data, and the point-in-time data is usable prior to the physical restoration of the disk volume.

The virtualizing fabric switch then can direct data transfer from the point-in-time volume to the disk volume in order to restore the disk volume to the point in time (450). Such a transfer can proceed either directly through the SAN from the temporal storage appliance to the disk volume or through the virtualizing switch. Through this process a mirror of the point in time volume made by the storage appliance is constructed on the disk volume. During the mirroring procedure, the disk volume is write-only while the point-in-time volume is read/write, the opposite of a normal operation of the linked volume. Once the disk volume is restored to the desired point-in-time, the virtualizing switch can make the disk volume once again available for read/write operation and return the storage appliance to write/only access (460). The temporal storage appliance then resumes recording changes to the disk volume in a temporally referenced manner picking up at the time of disk volume restoration.

An Example Computing And Network Environment

As shown above, the present invention can be implemented using a variety of computer systems and networks. An example of one such computing and network environment is described below with reference to FIGS. 5 and 6.

Figure 5:
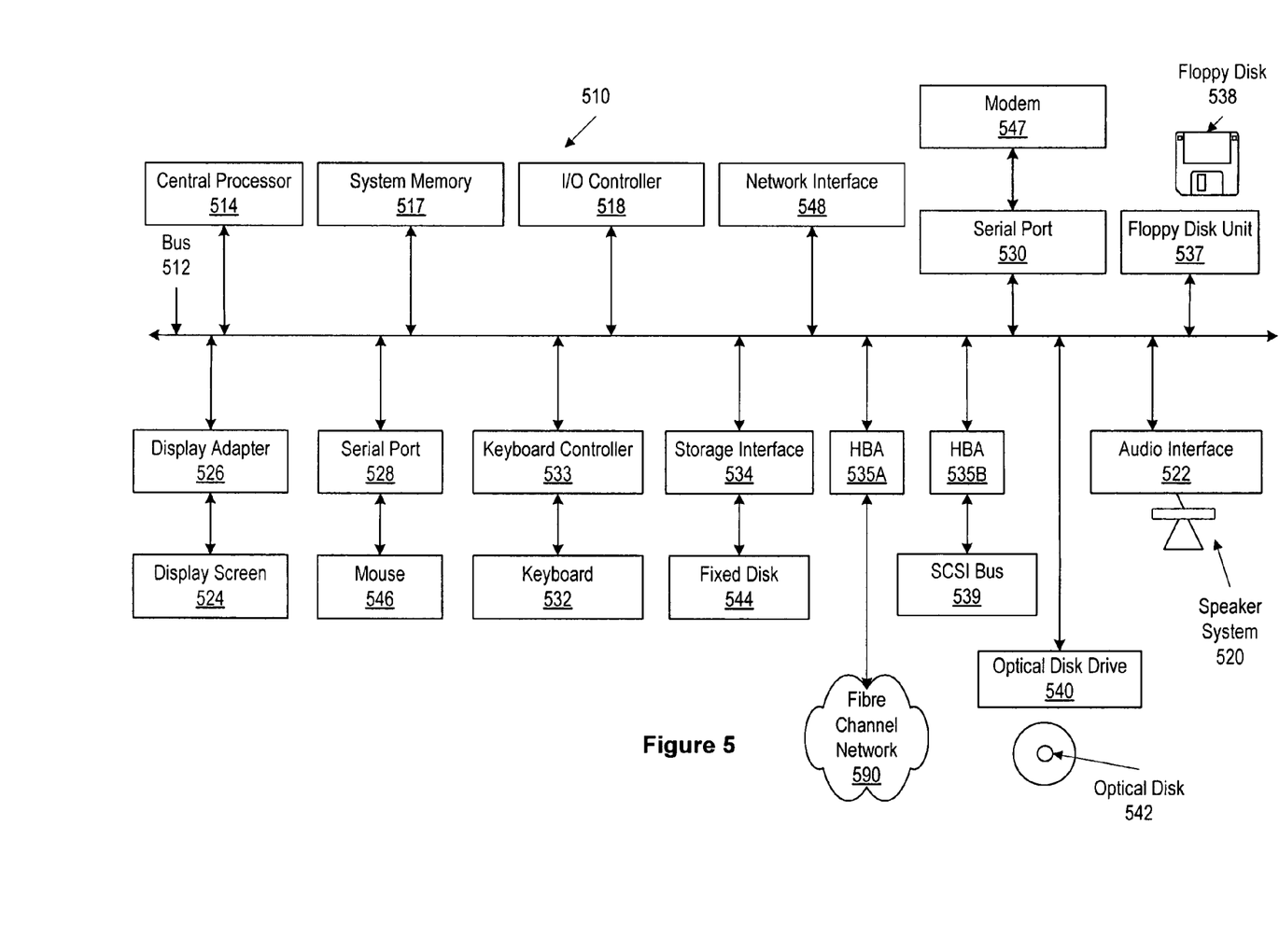
FIG. 5 is a block diagram of a computer system suitable for implementing the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. Additionally, computer system 510 can be any kind of computing device, and so includes personal data assistants (PDAs), network appliance, X-window terminal or other such computing devices. The operating system provided on computer system 510 may be MS-DOS®, MS-WINDOWS®, OS/2®, UNIX®, Linux®, or another known operating system. Computer system 510 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
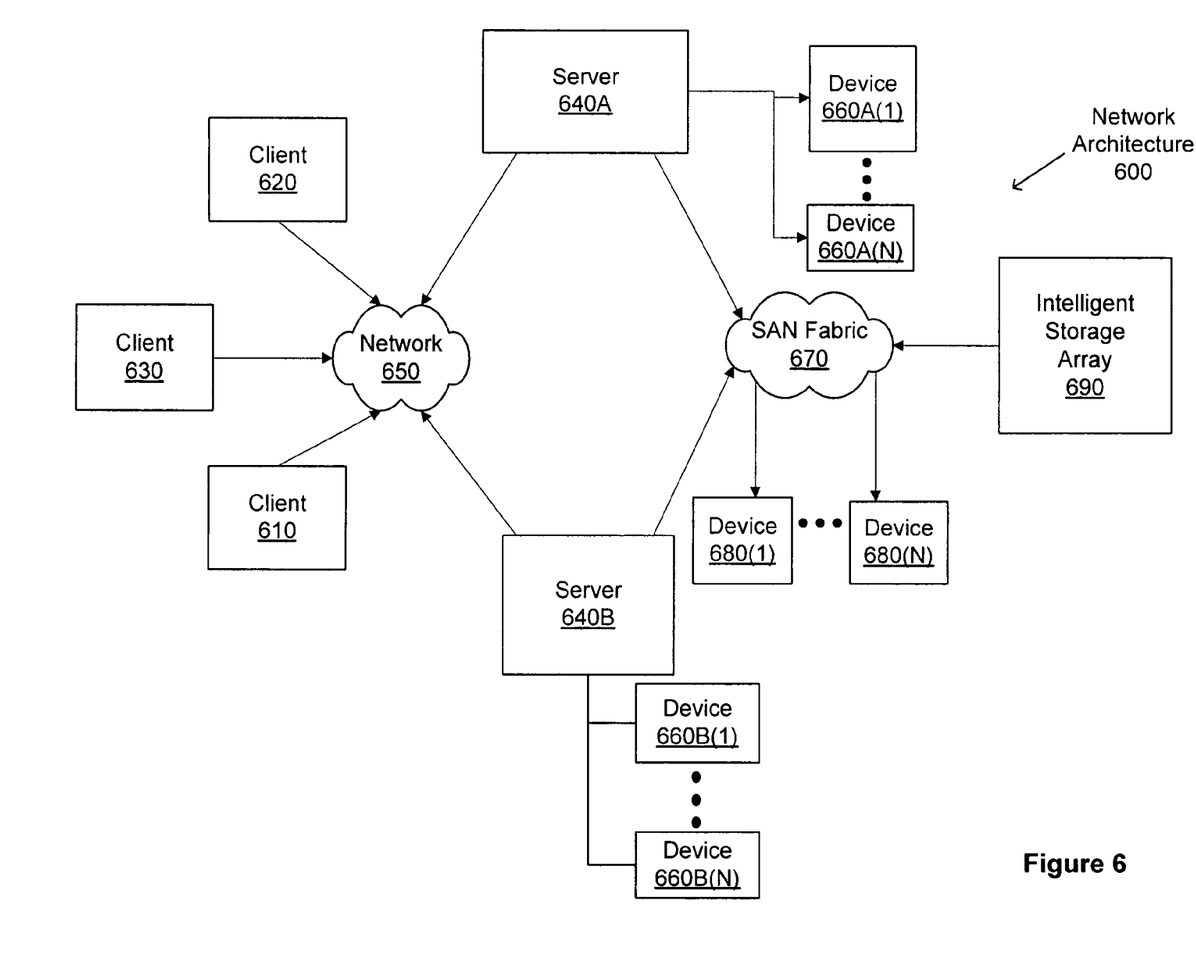
FIG. 6 is a block diagram illustrating a network architecture suitable for implementing the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. SAN fabric 670 can include one or more switches (e.g., switch 130) configured to perform storage virtualization. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a virtualizing fabric switch providing a VLUN (Virtual Logic Unit Number) comprising a disk volume and a temporal storage appliance;
   the virtualizing fabric switch receiving a request to restore data on the VLUN to a state at a point in time prior to a time when the request was received;
   the virtualizing fabric switch requesting the temporal storage appliance to create a point-in-time volume representing the state of data on the VLUN at the requested point in time, wherein
   the temporal storage appliance is coupled to a SAN.

2. The method of claim 1 further comprising:
   the virtualizing fabric switch transferring data from the point-in-time volume to the disk volume.

3. The method of claim 1, wherein
   the disk volume is a mirror of the point-in-time volume.

4. The method of claim 1 further comprising:
   upon creation of the point-in-time volume, the virtualizing fabric switch directing VLUN read and write operations to the point-in-time volume.

5. A computer program product having instructions stored on a computer-readable storage medium comprising:
   a first set of instructions, executable on a processor in a virtualizing fabric switch, configured to provide a VLUN (Virtual Logic Unit Number) comprising a disk volume and a temporal storage appliance;
   a second set of instructions, executable on the processor in the virtualizing fabric switch, configured to receive a request to restore data on the VLUN to a state at a point in time prior to a time when the request was received;
   a third set of instructions, executable on the processor in the virtualizing fabric switch, configured to request the temporal storage appliance to create a point-in-time volume representing the state of data on the VLUN at the requested point in time, wherein
   the temporal storage appliance is coupled to a SAN.

6. The computer program product of claim 5 further comprising:
   a fourth set of instructions, executable on the processor in the virtualizing fabric switch, configured to transfer data from the point-in-time volume to the disk volume.

7. The computer program product of claim 5 further comprising:
   a fifth set of instructions, executable on the processor in the virtualizing fabric switch, configured to direct VLUN read and write operations to the point-in-time volume, upon creation of the point-in-time volume.

* * * * *